United States Patent [19]

Vanderpool et al.

[11] 4,447,404
[45] May 8, 1984

[54] RECOVERY OF MOLYBDENUM FROM MOLYBDENUM DISULFIDE

[75] Inventors: Clarence D. Vanderpool; Martin B. MacInnis, both of Towanda, Pa.

[73] Assignee: GTE Products Corporation, Stamford, Conn.

[21] Appl. No.: 451,120

[22] Filed: Dec. 20, 1982

[51] Int. Cl.³ ............................................. C01G 39/00
[52] U.S. Cl. ....................................... 423/61; 423/593
[58] Field of Search ............................ 423/53, 61, 593

[56] References Cited

U.S. PATENT DOCUMENTS 3,117,860 1/1964 Bjerkerud et al. .................... 423/53
3,694,147 9/1972 Drobnick et al. .................... 423/53
3,911,076 10/1975 Probert et al. ....................... 423/53
3,941,867 3/1976 Wilkorirsky et al. ................ 423/53

FOREIGN PATENT DOCUMENTS 54629 1/1968 Poland .................................. 423/53

Primary Examiner—Herbert T. Carter
Attorney, Agent, or Firm—Robert E. Walter

[57] ABSTRACT

Ammonium molybdate is produced from molybdenum disulfide concentrate by contacting the concentrate with an aqueous solution of ammonium chloride and chlorine at suitable concentrations and for a sufficient period of time to solubilize molybdenum disulfide present in said concentrate as molybdate ions and form a solution of ammonium molybdate.

1 Claim, No Drawings

RECOVERY OF MOLYBDENUM FROM MOLYBDENUM DISULFIDE

FIELD OF INVENTION

This invention relates to the recovery and purification of molybdenum from molybdenum disulfide. Specifically, the invention relates to recovery of ammonium molybdate from molybdenum disulfide without roasting in air and without the production of $SO_2$.

BACKGROUND OF INVENTION

The present commercial method is air roasting. The production of $SO_2$ is controlled by the Environmental Protection Agency. The $SO_2$ produced by any roasting of sulfides requires the addition of scrubbers and perhaps the construction of a sulfuric acid plant.

A laboratory method for digestion of $MoS_2$ is oxidation with $HNO_3$. However, this also causes pollution problems with the $NO_x$ vapors which are produced. Again, there is no inexpensive way of removing these vapors.

Digestion of $MoS_2$ in boiling $H_2SO_4$ is also possible; however, this requires excessive amounts of $H_2SO_4$ (1 gram of $MoS_2$ to 10 grams of $H_2SO_4$). Also, a temperature of 240° C. for 5 hours is necessary. During this boiling period, $SO_3$ vapors are coming off and must be scrubbed.

SUMMARY OF THE INVENTION

The primary general objective of this invention is to provide an integrated method for processing molybdenum from crude $MoS_2$ without the production of $SO_2$.

Another, more specific, objective is to provide an integrated process for recovering molybdenum from molybdenum disulfide by dissolution of the molybdenum disulfide directly without the necessary oxidation in air.

Another more specific objective is to provide a process whereby ammonium molybdate solutions of sufficiently high purity are produced for recovery of molybdenum by spray-drying, evaporation to dryness, or crystallizing to the desired end product.

In accordance with the present invention, there is provided a process for producing ammonium molybdate from a molybdenum disulfide concentrate comprising contacting said concentrate with an aqueous solution of ammonium chloride and chlorine at suitable concentrations for a sufficient period of time to solubilize molybdenum disulfide present in said concentrate as molybdate ions and forming a solution of ammonium molybdate.

DETAILED DESCRIPTION

Molybdenum disulfide dissolves in a solution of ammonium chloride in the presence of chlorine gas. It is theorized that the $Cl_2$ oxidizes some of the $NH_4Cl$ to nitrosyl chloride (NOCl) which in turn oxidizes the molybdenum disulfide. It's also possible that the $MoS_2$ is oxidized directly by the $O_2$ produced by the $Cl_2$ in the water. Molybdenyl sulfate may be produced which may react with the $NH_4$ in the $NH_4Cl$ to form some $NH_4$ molybdenyl complex.

Ammonium hydroxide may be added to the resulting solution after the formation of molybdate ions to form complex ammonium molybdates which may be crystallized or spray dried by methods known in the art.

EXAMPLE

About 100 grams of molybdenum disulfide containing 63.6% molybdenum trioxide which had been ballmilled to a Fisher Sub Sieve Size of 0.70 was slurried in 500 cubic centimeters of water with 100 grams of ammonium chloride.

The chlorine gas was bubbled through the mixture for approximately 3 hours. During this time the temperature increased to approximately 70° centigrade and the solution turned from a black slurry to a white slurry. After 3 hours, instead of the chlorine gas being absorbed, it started bubbling through the solution and the temperature dropped. This indicated that the reaction was over.

The slurry was filtered and the clear yellow filtrate adjusted to a pH of 2.9 using ammonium hydroxide. After the pH adjustment, the solution was digested at 75°-80° C. for 4 hours. This is produced a white crystalline material of some type ammonium polymolybdate. X-ray was unable to identify this material but some lines agreed quite well with the compound $2(NH_4)_2O.25MoO_3.9H_2O$.

Spectrographic analysis showed:
Ca 4.6 ppm; Mn <0.82 ppm; Sn <8.2; Cu 2.8; Fe >820 ppm; Ni <0.16 ppm; Pb 159; Cr <2.4; Mg 1.4 ppm; Si 51 ppm; Al 3.5.

Since the Fe, Si Pb was high, the material was dissolved in ammonium solution and the precipitate of iron was filtered. The solution was evaporated to crystals of ammonium paramolybdate.

Spec quant on this shows

| Ca | 4.0 ppm | Sn | <8.2 ppm |
|----|---------|-----|----------|
| Fe | 57 | Pb | 22 |
| Mg | <.41 | Al | 3.0 |
| Mn | <.82 | Cu | 2.5 |
| Ni | 1.9 | Cr | <2.4 |
| Si | 21 | | |

We claim:

1. A process for producing ammonium molybdate from a molybdenum disulfide concentrate comprising contacting said concentrate with an aqueous solution of ammonium chloride and chlorine at suitable concentrations and for a sufficient period of time to solubilize molybdenum disulfide present in said concentrate as molybdate ions and adding ammonium hydroxide to said aqueous solution after said contacting to form a solution of ammonium molybdate.

* * * * *